United States Patent
Dolgov et al.

(10) Patent No.: US 8,392,117 B2
(45) Date of Patent: Mar. 5, 2013

(54) USING TOPOLOGICAL STRUCTURE FOR PATH PLANNING IN SEMI-STRUCTURED ENVIRONMENTS

(75) Inventors: Dmitri A. Dolgov, Ann Arbor, MI (US); Sebastian Thrun, Stanford, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 615 days.

(21) Appl. No.: 12/471,079

(22) Filed: May 22, 2009

(65) Prior Publication Data
US 2010/0299013 A1 Nov. 25, 2010

(51) Int. Cl.
*G01C 21/00* (2006.01)
*G01C 21/34* (2006.01)

(52) U.S. Cl. .......... 701/533; 701/301
(58) Field of Classification Search .......... None
See application file for complete search history.

(56) References Cited

U.S. PATENT DOCUMENTS

| | | | |
|---|---|---|---|
| 4,817,000 A | 3/1989 | Eberhardt | |
| 5,363,305 A | 11/1994 | Cox et al. | |
| 6,529,806 B1 | 3/2003 | Licht | |
| 6,694,233 B1 | 2/2004 | Duff et al. | |
| 7,167,799 B1 | 1/2007 | Dolgov et al. | |
| 7,363,154 B2 | 4/2008 | Lindores | |
| 7,734,387 B1* | 6/2010 | Young et al. | 701/23 |
| 2005/0159879 A1 | 7/2005 | De Graeve et al. | |
| 2005/0192749 A1* | 9/2005 | Flann et al. | 701/301 |
| 2005/0216182 A1 | 9/2005 | Hussain et al. | |
| 2006/0025888 A1 | 2/2006 | Gutmann et al. | |
| 2006/0149465 A1* | 7/2006 | Park et al. | 701/209 |
| 2006/0178825 A1 | 8/2006 | Eglington et al. | |

FOREIGN PATENT DOCUMENTS

JP 2006-105686 * 4/2006

OTHER PUBLICATIONS

Springer, "The 2005 DARPA Grand Challenge: The Great Robot Race," 2005.
Special issue on the 2007 DARPA urban challenge, part I. *Journal of Field Robotics*, vol. 25, No. 8, pp. 423-566, Aug. 2008.
Special issue on the 2007 DARPA urban challenge, part II. *Journal of Field Robotics*, vol. 25, No. 9, pp. 567-724, Sep. 2008.
Brock, O. et al., "High-speed navigation using the global dynamic window approach." *International Conference on Robotics and Automation (ICRA)*, 1999.
Dickmanns, E. D. et al., "Autonomous high speed road vehicle guidance by computer vision," *Triennial World Congress of the International Federation of Automatic Control*, vol. 4, pp. 221-226, Jul. 1987.
Dolgov, Dmitri et al., "Detection of principal directions in unknown environments for autonomous navigation," *Proceedings of the Robotics: Science and Systems (RSS-08)*, Zurich, Switzerland, Jun. 2008.

(Continued)

*Primary Examiner* — Michael J. Zanelli
(74) *Attorney, Agent, or Firm* — Oblon, Spivak, McClelland, Maier & Neustadt, L.L.P.

(57) ABSTRACT

A method of creating a lane network of a semi-structured environment for a vehicle, assigning a corresponding cost function to each of a plurality of coordinates of the semi-structured environment using the lane network and a state of the vehicle, the state of the vehicle corresponding to a coordinate location of the vehicle and an angular orientation of the vehicle, and determining an obstacle-free path on the semi-structured environment using the cost function of each of the plurality of coordinates.

9 Claims, 16 Drawing Sheets

OTHER PUBLICATIONS

Dolgov, Dmitri et al., "Path planning for autonomous vehicles in unknown semi-structured environments," *Proceedings of the Eleventh International Symposium on Experimental Robotics* (ISER-08), Athens, Greece, Jul. 2008.

James, Michael, "A Method for Mapping Dynamic Environments Containing Dynamic Obstacles Using Free-Space Analysis," *Under Review*, 2008.

A. Kelly, "An intelligent predictive control approach to the high speed cross country autonomous navigation problem," 1995.

Kolski, Sascha et al., "Autonomous driving in structured and unstructured environments," *IEEE Intelligent Vehicles Symposium*, 2006.

Montemerlo, Michael et al., "Junior: The stanford entry in the urban challenge," *Journal of Field Robotics*, vol. 25, No. 9, pp. 569-597, 2008.

Singh, Sanjiv et al., "Recent progress in local and global traversability for planetary rovers," *Proceedings of the IEEE International Conference on Robotics and Automation*, 2000. IEEE, Apr. 2000.

Stentz, Anthony (Tony) et al., "A complete navigation system for goal acquisition in unknown environments," Proceedings 1995 IEEE/RSJ International Conference on Intelligent Robotic Systems (IROS '95), vol. 2, Aug. 1995.

Thorpe, C. et al., "Automated highway and the free agent demonstration. In Robotics Research—International Symposium," vol. 8, 1998.

Tsugawa, S. et al. "Super smart vehicle system, its concept and preliminary works," Vehicle Navigation and Information Systems, vol. 2, pp. 269-277, Oct. 1991.

Varaiya, P., "Smart cars on smart roads: Problems of control," IEEE Transactions on Automatic Control, vol. 38, No. 2, Feb. 1993.

Dolgov et al., "Path Planning for Autonomous Driving in Unknown Environments," Experi. Robotics: The 11th Intern. Sympo., STAR 54, pp. 55-64, Springer-Verlag Berlin Heidelberg, May 28, 2009.

Dolgov et al., "Path Planning for Autonomous Vehicles in Unknown Semi-structured Environments," International Journal of Robotics Research, 29(5):485-501, 2010.

Khatib et al., "Preface," and "Contents," Experi. Robotics: The 11th Intern. Sympo., STAR 54, Springer-Verlag Berlin Heidelberg, May 28, 2009 (pp. 7-9 of submitted document).

* cited by examiner

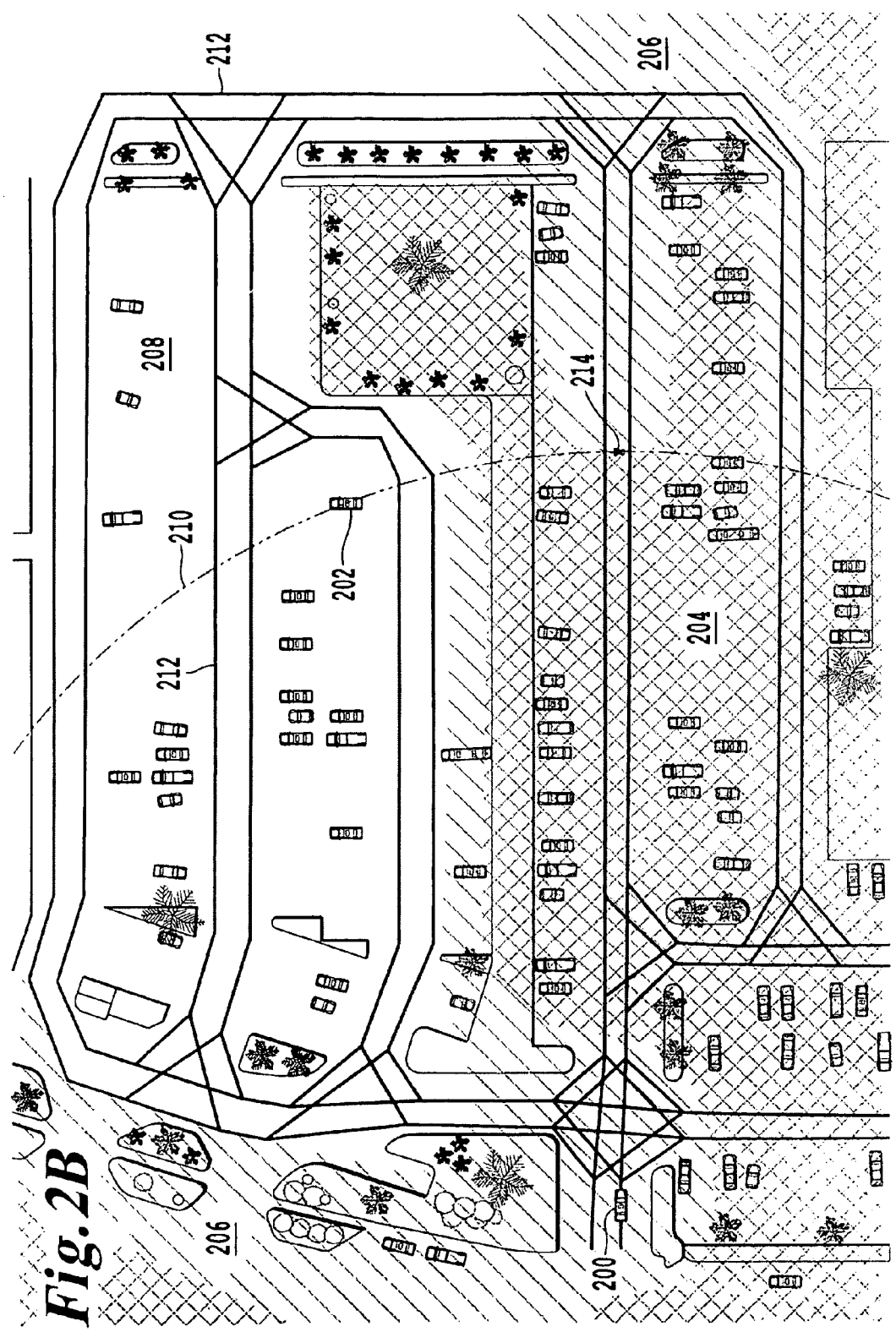

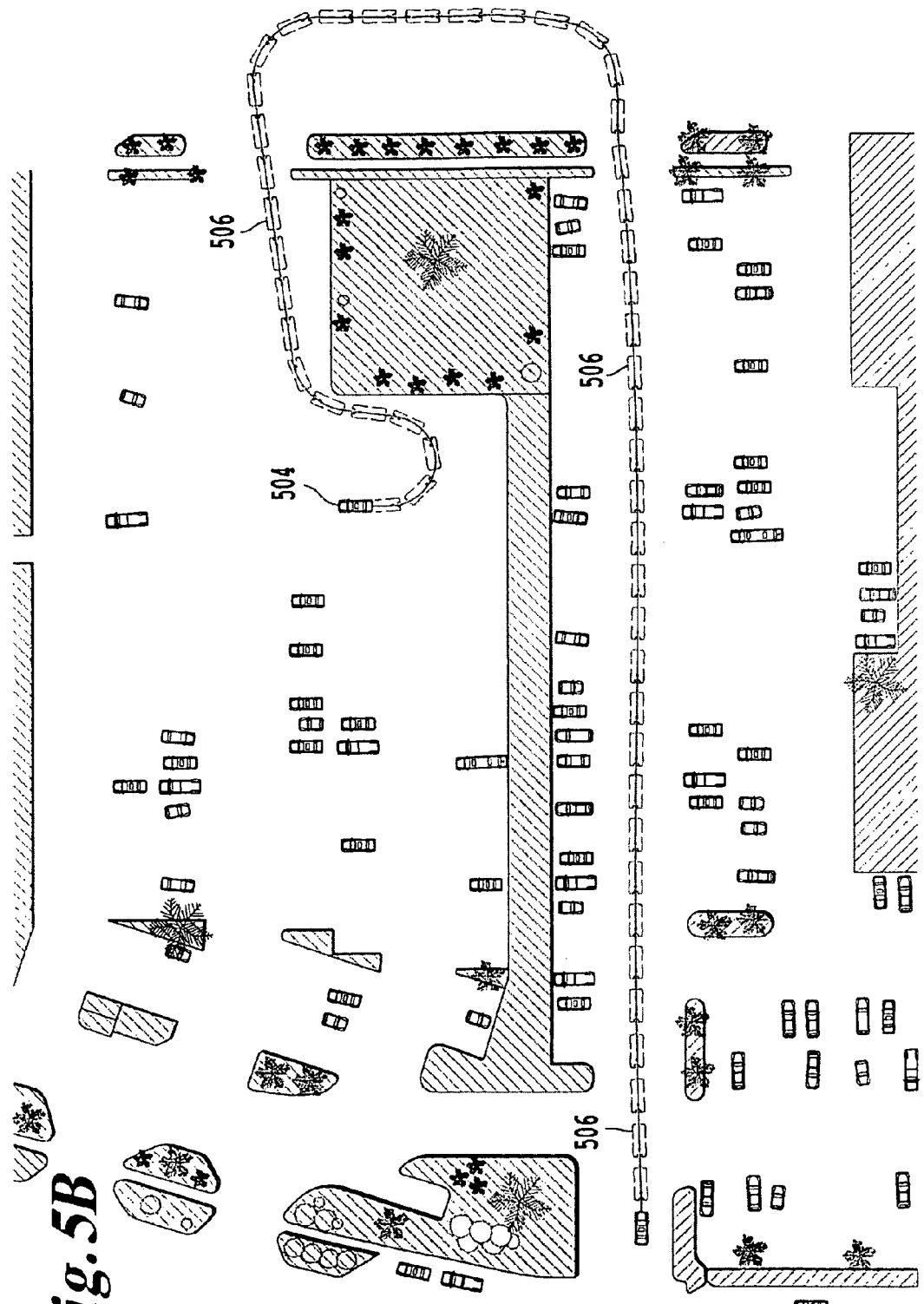

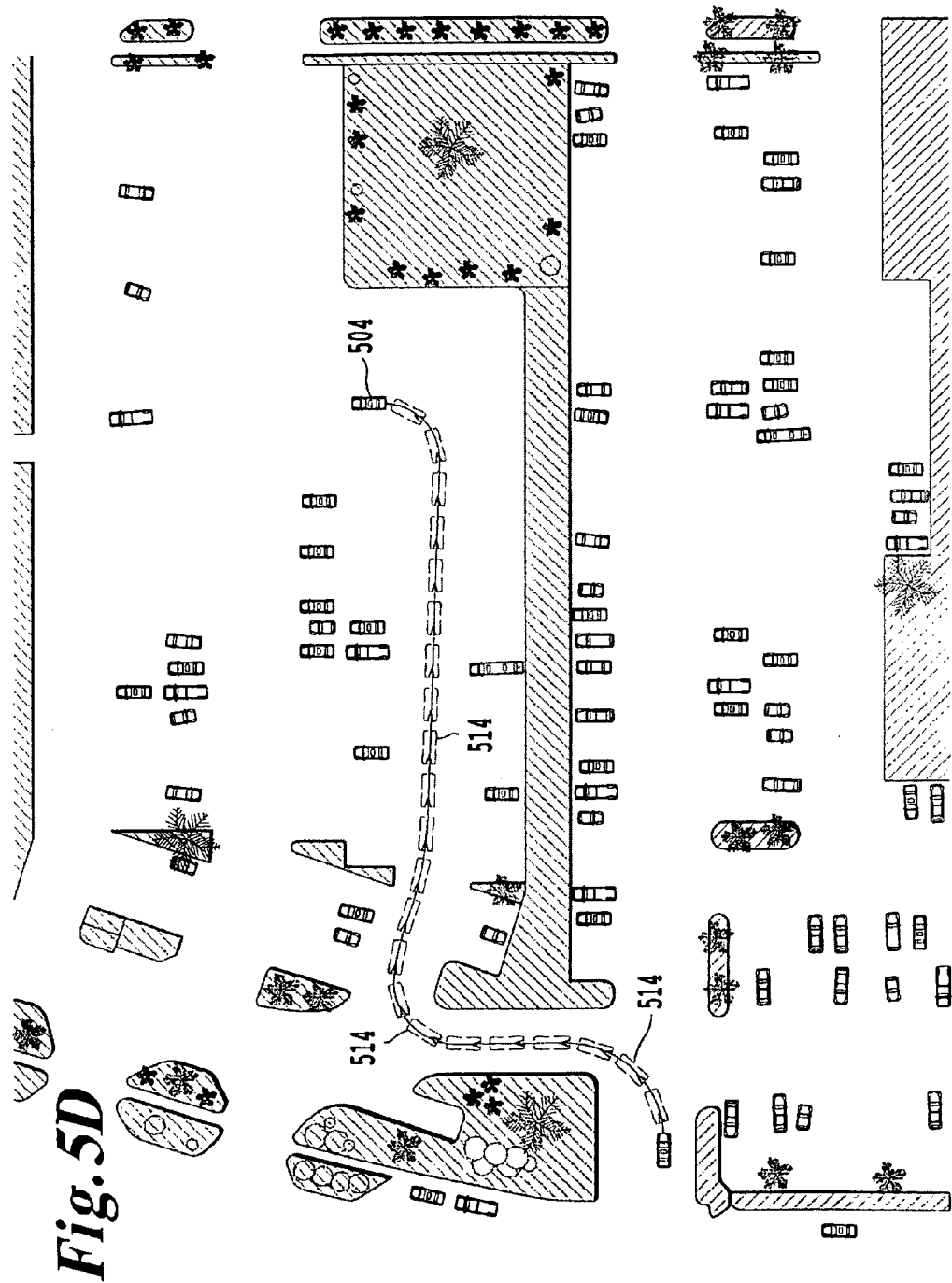

USING TOPOLOGICAL STRUCTURE FOR PATH PLANNING IN SEMI-STRUCTURED ENVIRONMENTS

FIELD OF THE INVENTION

The invention relates to the use of topological structure to improve the quality of path planning for autonomous vehicles operating in semi-structured environments such as parking lots.

BACKGROUND OF THE INVENTION

Autonomous driving is a long-standing problem in robotics, as discussed in Springer, "The 2005 DARPA Grand Challenge: The Great Robot Race," 2005, "Special issue on the 2007 DARPA urban challenge, part I," Journal of Field Robotics, 25(8):423-566, August 2008, and "Special issue on the 2007 DARPA urban challenge, part II," Journal of Field Robotics, 25(8):423-566, August 2008.

Existing work in autonomous driving focuses either on highly structured environments, such as highways or city streets (see E D Dickmanns and A Zapp, "Autonomous high speed road vehicle guidance by computer vision. Triennial World Congress of the International Federation of Automatic Control," 4:221-226, July 1987, S Tsugawa, N Watanabe, and H. Fujii, "Super smart vehicle system-Its concept and preliminary works," Vehicle Navigation and Information Systems, 2:269-277, October 1991, C. Thorpe, T. Jochem, and D. Pomerleau, "Automated highway and the free agent demonstration," In Robotics Research—International Symposium, volume 8, 1998, P. Varaiya, "Smart cars on smart roads: Problems of control," IEEE Transactions on Automatic Control, 38(2), February 1993), or on unstructured off-road driving (see A. Kelly, "An intelligent predictive control approach to high speed cross country autonomous navigation problem," 1995, Anthony (Tony) Stentz and Martial Hebert, "A complete navigation system for goal acquisition in unknown environments," Proceedings 1995 IEEE/RSJ International Conference On Intelligent Robotic Systems (IROS '95), volume 1, pages 425-432, August 1995, O. Brock and O. Khatib, "High-speed navigation using the global dynamic window approach," International Conference on Robotics and Automation (ICRA), 1999, Sanjiv Singh, Reid Simmons, Trey Smith, Anthony (Tony) Stentz, Vandi Verma, Alex Yahja, and Kurt Schwehr, "Recent progress in local and global traversability for planetary rovers," Proceedings of IEEE International Conference on Robotics and Automation, April 2000, Springer, "The 2005 DARPA *Grand Challenge: The Great Robot Race,*" 2005, Sascha Kolski, David Ferguson, Mario Bellino, and Roland Siegwart, "Autonomous driving in structured and unstructured environments," IEEE intelligent Vehicles Symposium, 2006).

In structured environments, such as highways/roads, there is usually a topological graph (i.e., a lane-network graph) imposed on the environment, and the vehicle is constrained to drive on the graph with only small deviations admissible. In the case of unstructured driving, the robot is not constrained by a graph and is free to choose any path, subject to safety and kinodynamic constraints.

SUMMARY OF THE INVENTION

There are also many environments that are semi-structured, i.e., there is a natural topological graph structure (which may or may not be predefined and available to the robot), but maneuvers off the graph are valid and frequent. Such driving conditions arise, for example, in parking lots and garages, construction zones and around shopping centers.

In one aspect, a method of planning a path for a vehicle in a semi-structured environment is provided. The method includes creating a lane network of an environment for a vehicle using a processor of a computing device and storing the lane network in electronic memory of the computing device, and calculating a cost function for each of a plurality of coordinates of the environment using the processor from the lane network, a goal position of the vehicle and a state of the vehicle, the state of the vehicle including a location and an angular orientation of the vehicle. Then, an obstacle-free path is determined for the vehicle from the location to the goal position by minimizing a calculated cost of the obstacle-free path, the calculated cost being a sum of the cost functions of the coordinates that the obstacle-free path intersects. In a further aspect, the calculating includes calculating a first cost function for each of the plurality of coordinates based on a distance between the each of the plurality of coordinates and the goal position, and then modifying the first cost function with a modifying function corresponding to the lane network and the state of the vehicle.

In yet a further aspect, the calculated cost of the obstacle-free path is defined as $$\rho(s) = \rho_0(s) + w_G \sum_i D(\langle x_i, \theta_i \rangle, G),$$

where $\rho_0(s)$ is the first cost function created using a free-space planner, $$w_G \sum_i D(\langle x_i, \theta_i \rangle, G)$$

is the modifying function and modifies the calculated cost if the obstacle-free path deviates from the lane network defined as G, where $s=\{x_i,\theta_i\}$ is a trajectory of the vehicle at a state $\langle x_i, \theta_i \rangle$, $w_G$ is a predetermined weight factor, and $D(\langle x_i, \theta_i \rangle, G)$ is a distance between the vehicle at a state $\langle x_i, \theta_i \rangle$ and a nearest edge of the lane network G. In one aspect, the minimizing the calculated cost $$\rho(s) = \rho_0(s) + w_G \sum_i D(\langle x_i, \theta_i \rangle, G)$$

uses a conjugate-gradient descent.

In other aspects, the determining includes determining a plurality of obstacle-free paths between the location of the vehicle and the goal position, each of the plurality of obstacle-free paths has a calculated cost, and an obstacle-free path of the plurality of obstacle-free paths having the lowest calculated cost is recorded onto the electronic memory. In further aspects, the determining includes smoothing the obstacle-free path.

In another aspect, a method of planning a path for a vehicle is provided. This method includes accessing a lane network of an environment stored in electronic memory of a computing device, and determining a location and a goal location of the vehicle within the environment using a processor of the computing device, and calculating a cost function for a plurality of coordinates of the environment between the location and the goal location using the processor, the cost function based on the lane network, the goal location and a state of the vehicle, the state of the vehicle including the location and an angular orientation of the vehicle. Then, an obstacle-free path of the environment is determined by minimizing a sum of the cost functions corresponding to the coordinates which intersect the obstacle-free path between the location and the goal location using the processor and recording the determined obstacle-free path onto the electronic memory.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

In the following description, the invention is explained in more detail in relation to the enclosed drawings, in which:

FIGS. 2A-2B show cost distributions of paths for navigating the environment shown in FIG. 1;

FIGS. 5A-5D depict differences between path planning based on free-space planning and path planning corresponding to topological structure;

DETAILED DESCRIPTION OF THE INVENTION

One of the challenges for an autonomous vehicle operating in a semi-structured environment lies in path planning. On one hand, unconstrained free-space path planning often produces trajectories that are inappropriate for semi-structure environments (e.g., cutting across parking lots). On the other hand, constraining the robot to only drive on the lane graph might be too restrictive (have a high cost or is inefficient). A primary objective is to integrate graph planning and free-space planning. The result is a faster planning method that produces trajectories conforming to common driving conventions implied by the environment's structure.

Figure 1:
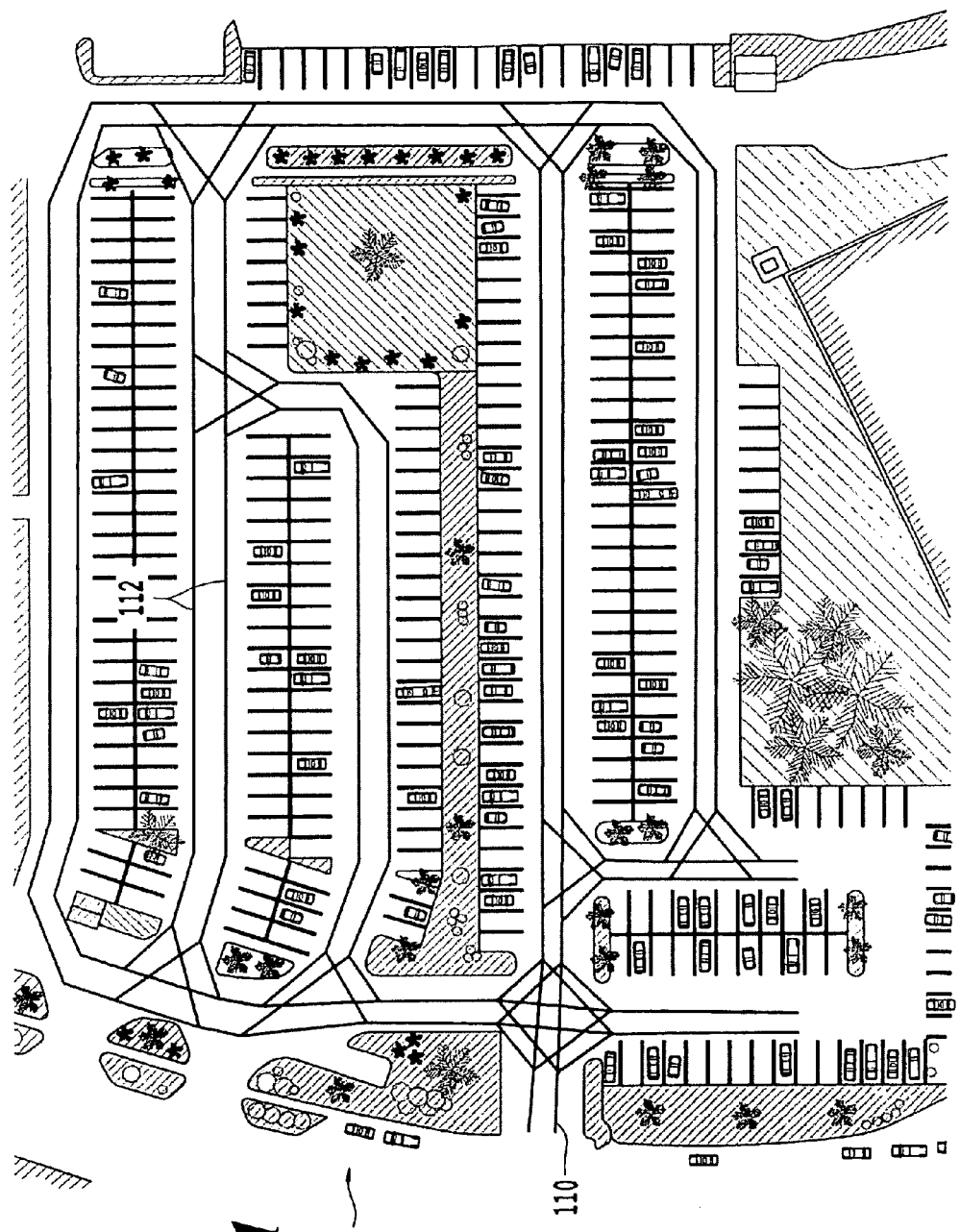
FIG. 1 illustrates a lane-network graph imposed atop a semi-structured environment.

A semi-structured environment is illustrated in FIG. 1 as parking lot 100, where vehicles will generally adhere to a lane graph 110. However, at times, a significant deviation from the graph 110 while performing maneuvers such as turning around, pulling in and out of parking spaces, avoiding other vehicles, etc., will occur. The graph 110 is a topological graph, having driving lanes 112, but maneuvers off the graph 110 are allowed. A primary objective is to find a trajectory from the initial state of the vehicle $\langle x_0, y_0, \theta_0 \rangle$ to a given goal state $\langle x_g, y_g, \theta_g \rangle$ which is safe, kinematically-feasible, and near-minimal in length. Lane networks are constructed manually or autonomously, as discussed in co-pending U.S. Ser. No. 12/428,222 entitled "Detection of Topological Structure from Sensor Data with Application to Autonomous Driving in Semi-Structured Environments," and filed on Apr. 22, 2009, the entirety of which is incorporated herein by reference.

The process described below is an improvement upon a free-space planner for a robotic vehicle described in Dmitri Dolgov, Sebastian Thrun, Michael Montermerlo, and James Diebel, "Path Planning for Autonomous Driving in Unknown Environments," Experimental Robotics: The Eleventh International Symposium, STAR 54, pp. 55-64, Spinger-Verlag, Berlin, Heidelberg, May 28, 2009, (hereinafter referred to as STAR 54), and Dmitri Dolgov and Sebastian Thrun, "Detection of principal directions in unknown environments for autonomous navigation," In Proceedings of the Robotics: Science and Systems (RSS-08), Zurich, Switzerland, Jun. 2008 (hereinafter referred to as RSS 2008). Both STAR 54 and RSS 2008 are incorporated herein in their entireties by reference. This process and associated path-planning algorithm consist of two phases. Phase one uses an A* search with a discrete set of control actions to find a safe, feasible, and approximately optimal trajectory. The trajectory is then improved in the second phase by solving a non-linear optimization problem in continuous coordinates, which is initialized with the A* solution from phase one. The extensions to the algorithm for taking advantage of the topological structure in a semi-structured environment are discussed below.

The first phase uses A* with a discrete set of control actions, operating on a 4-dimensional kinematic state of the vehicle $\langle x, \theta, r \rangle$, where $\langle x, \theta \rangle = \langle x, y, \theta \rangle$ defines the position and orientation of the vehicle, and $r = \{0, 1\}$ specifies the direction of motion (i.e., forward or reverse).

In this process, the lane network modifies the cost function over trajectories, in that paths deviating form the lane network incur a higher cost and are thus not preferred paths. Also, since the lane network corresponds to the topological structure of the environment, the graph provides a set of macro actions that is particularly well tuned to the environment.

Given a lane network represented as a directed graph $G = \langle V, E \rangle$ with $\alpha_E$ denoting the angle of edge E, a distance from a vehicle state to the graph is $D(G, \langle x, \theta \rangle) = \min\{E : |\alpha_E - \theta| < \alpha_{min}\} D(E, x)$, where $D(E, x)$ is the Euclidean distance between a line segment E and a point x. In other words, the distance between a state of the vehicle and the lane-network graph is defined as the Euclidean distance between the $\langle x, r \rangle$ position of the vehicle and the nearest edge, whose orientation is close (within a constant $\alpha_{min}$) to the orientation of the vehicle.

The traversal cost of A* that takes into account the lane-network graph G is defined as:

$$C(\langle x,\theta,r \rangle, \langle x+dx, \theta+d\theta, r' \rangle) = dl(1+\delta(1-r)C_{rev}) + \delta(1-|r-r'|)C_{sw} + dl\delta(D(\langle x,\theta \rangle, G) > D_{min})C_g,$$

where $\delta(i)$ is the Kronecker delta, $C_{rev}$ and $C_{sw}$ are the costs for driving in reverse and switching the direction of motion, respectively, and the term $C_G$ is the multiplicative penalty for deviating from the lane network by a distance of more than a predefined constant $D_{min}$.

The A* uses two heuristics to estimate the distance to the goal from any state in the search space as discussed in RSS 2008. The first heuristic takes into account the non-holonomic nature of the vehicle and ignores obstacles. This heuristic is preferably unchanged for the case of semi-structured planning.

The second heuristic ignores the non-holonomic nature of the vehicle and takes into account a current obstacle map, preferably using a lane-network graph. Effectively, the heuristic defines the robot as a disk with a diameter equal to the width of the vehicle and that the robot can move in any direction. The heuristic computes, for any $\langle x, y \rangle$ position, the minimal cost of the goal position. In the case of semi-structured planning, this heuristic corresponds to an A* in that deviating from the lane increases costs, but it provides poor guidance for the search. Thus, the heuristic is modified to take into account the graph-modified traversal cost defined above to retain admissibility of the heuristic in a 2D $\langle x,y \rangle$ case by taking the distance to the graph to be a distance from the closest 3D $\langle x,y,\theta \rangle$ state $D(x,G)=\min_\theta D((x,\theta),G)$.

Figure 2A:
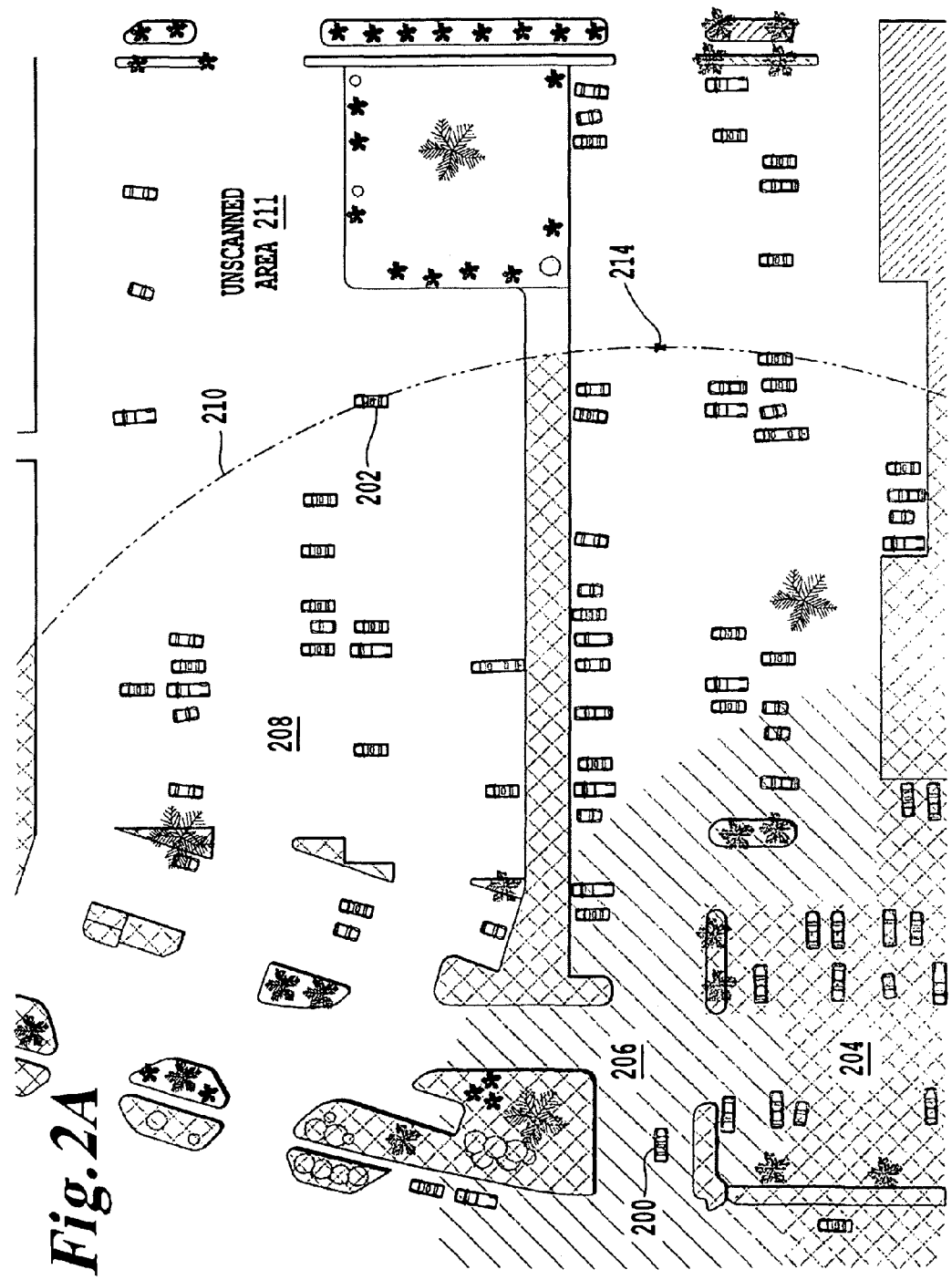

FIGS. 2A-2B illustrate modifications to the 2D holonomic-with-obstacles heuristic. FIG. 2A shows the heuristic for the free-space planning problem, whereas FIG. 2B fillustrates using a modified traversal cost which takes lane networks into account. Autonomous vehicles use various sensors to detect environment surroundings, including laser, optical/visual, radar, sonar, 3D LiDAR, etc., in particular to detect topological features of the environment. In an embodiment, the obstacles are detected in real-time and an obstacle map is generated on-board the autonomous vehicle. Alternatively, the lane-network is predetermined and/or is transmitted remotely to the vehicle.

In FIGS. 2A-2B, from the perspective of the vehicle 200 approaching the goal position 202, the cross-hatched area 204 represents areas of high cost. The hatched area 206 represents areas of medium cost, and the white space area 208 represents areas of low cost. The vehicle 200 has a sensor range extending to the line 210. In FIG. 2A, the line 210 represents a limit to the perspective of the vehicle 200 at its state shown in FIG. 2A. In an aspect, the line 210 is a limitation of a range of a sensor of the vehicle 200 and the area beyond the line 210 is an unknown area 211. Consequently, there is no cost function associated with the unknown area 211. In one aspect, the vehicle 200 will process the unknown area 211 as open space and associate a low-cost function to the area. In other aspects, the vehicle 200 will not process the unknown area 211. Although FIG. 2A illustrates the topological structure within the unknown area 211, this is done merely for perspective in comparison to the other figures. Since the vehicle's sensor range is limited to the line 210, the vehicle does not process topological structure within the unknown area 211 until the vehicle approaches the unknown area 211, thus putting the unknown area 211, or portions thereof, within the scanning range of the vehicle 200.

However, in FIG. 2B, the perspective of the vehicle 200 extends past the line 210 because a lane graph 212 has been imposed and is available to the vehicle 200 for processing. Effectively, the vehicle 200 is aware of the obstacles extending past line 210 in FIG. 2B due to the factoring in of the topological features of the environment from the lane graph 212. In practice, and in the example depicted in FIG. 2B, the vehicle 200 perceives it will not be able to simply advance to point 214 and make a left turn to reach the goal 202. On the other hand, in FIG. 2A, the vehicle 200 will traverse a route towards point 214 and plan on making a left turn, only to become aware that topological structure is impeding the planned path of the vehicle 200 including making such a left turn, which is discussed in detail later. The lane graph 212 in FIG. 2B now indicates a very high cost at point 214 and that a path of making a left turn is not the most efficient or part of a potential low-cost solution. Accordingly, the cost distribution of areas 204, 206 and 208 vary substantially between FIGS. 2A and 2B.

A lane-network graph in A* also provides a set of macro actions, tuned to the topology of the driving environment, which is utilized in the node-expansion step of the A* search. For each node, a fixed set of children is generated by applying a predefined set of control actions to the parent. In addition, a set of macro-actions is applied to a Reeds-Shepp curve to analytically compute a path to nearby nodes of the graph G. If the resulting Reeds-Shepp curve is collision-free, then the corresponding child is added to the search tree. Reeds-Shepp curves are discussed in Reeds, J. A., and Shepp, L. A., "Optimal paths for a car that goes both forwards and backwards," Pacific Journal of Mathematics 145(2):367-393, 1990.

Figure 3:
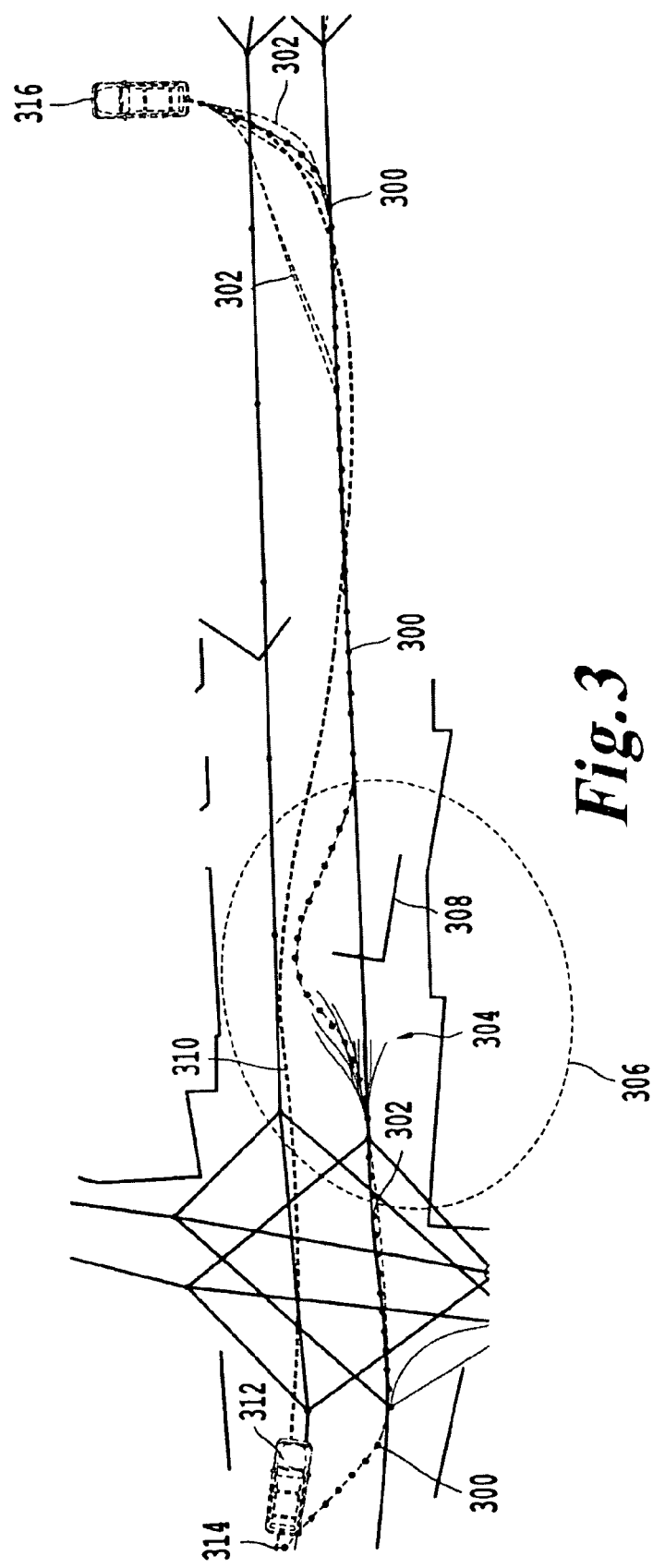
FIG. 3 shows results of a smoothing function of a path avoiding an obstacle.

In FIG. 3, the Reeds-Shepp curves corresponding to macro-actions to and between nodes 300 of the lane-network graph G are identified as curves 302, while free-space expansions are identified as curves 304. The area 306 where the lane blocked by obstacle 308 prevents transitions between graph nodes 300 and results in the free-space forward expansions 304 around the obstacle 308 until a collision-free Reeds-Shepp solution can be generated to the next graph node. Such a solution is then smoothed to create a path 310. The smoothing is discussed below. In FIG. 3, the vehicle 312 has a start position at node 314 and a goal position 316.

A uniformly discretized version of the A* solution is used to formulate a non-linear continuous-variable optimization problem on the coordinates of the vertices of the path. The objective function used in the optimization has terms for ensuring safety and kinematic feasibility of the trajectory, while biasing it towards shorter and smoother curves. The general details are described in RSS 2008. The modifications to the objective function for biasing the solution towards curves that lie close to graph G, and the improvements thereof, are discussed below.

Figure 4:
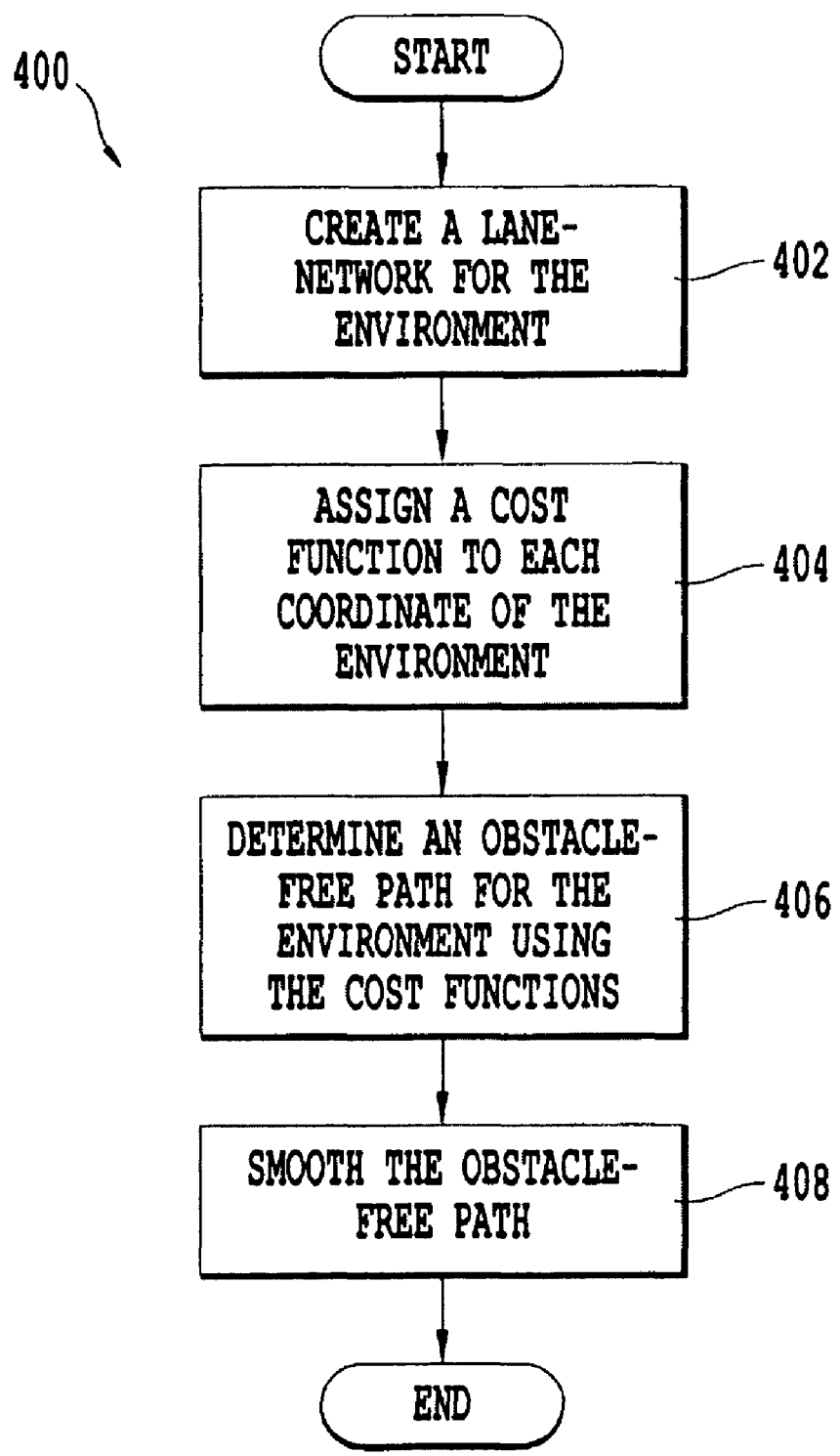
FIG. 4 shows a flowchart of a process of an embodiment.

FIG. 4 illustrates a process 400 of modifying the A* solution according to an embodiment. At step 402, a lane-network is created for a semi-structured environment, and at step 404, a cost function is assigned to each coordinate of the environment respective to a state (position and alignment) of the vehicle and a predetermined goal state. Then, at step 406 an obstacle-free path for the environment is determined using the corresponding cost functions, and at step 408 the obstacle-free path is smoothed to create a path to be taken by the vehicle. Smoothing according to an embodiment is discussed below.

Given trajectory $s=\{x_i, \theta_i\}$, the potential $$\rho(s) = \rho_0(s) + w_G \sum_i D(\langle x_i, \theta_i \rangle, G),$$

where $\rho_0$ (s) includes the potential terms used in the free-space planner described in RSS 2008, while the second term provides a penalty for deviating from the graph and $w_G$ is the associated weight factor. Smoothing is accomplished by minimizing the potential $$\rho(s) = \rho_0(s) + w_G \sum_i D(\langle x_i, \theta_i \rangle, G).$$

Conjugate-gradient descent is used to obtain a solution to the minimization problem above. An efficient implementation of conjugate-gradient descent uses an analytical gradient of the objective function, which is computed for a lane-graph attraction potential as described below.

For a given state $\langle x_i, \theta_i \rangle$, the closest edge $E_{min}$ is found that has an orientation satisfying the condition $|\alpha_E - \theta_i| < \alpha_{min}$. Then, the derivative of the distance between x and $E_{min}$ is computed. The edge $E_{min}$ has end points $p_0$ and $p_1$, and $p=p_0-p_1$. For convenience, the trajectory vertex x is referred to as d. Then, the derivative for the distance between point d and point p is computed. The term e is the projection of d onto p and $e=p_1+\beta p$, and $$\beta = \frac{(d-p_1)(p)}{\|p\|^2}.$$

Consider the case where $0 \leq \beta \leq 1$, i.e., d is closer to the interior of the segment ($p_0$, $p_1$) than to either for the endpoints. Otherwise the problem reduces to the derivative of distance between two points, which is discussed in RSS 2008. The derivative of the length of r=d−e (the vector from data point d to the projection point e) is $$\frac{\partial \|r\|}{\partial d} = \frac{r^T}{\|r\|} \frac{\partial r}{\partial d}$$

$$= \frac{r^T}{\|r\|} \frac{\partial (d-e)}{\partial d}$$

$$= \frac{r^T}{\|r\|} \left(I - \frac{2\beta^T}{\partial d} p\right).$$

Expanding the last term gives $$\frac{\partial \beta}{\partial d} = \frac{1}{\|p\|^2} \frac{\partial d - p}{\partial d}$$

$$= \frac{1}{\|p\|^2} (Ip)$$

$$= \frac{p}{\|p\|^2},$$

which results in $$\frac{\partial \|r\|}{\partial d} = \frac{1}{\|r\|} \left(r^T - \frac{p^T}{\|r\|^2}(rp)\right).$$

Combined with the derivatives of other terms described in RSS 2008, the realization of a conjugate gradient is standard.

Figure 5A:
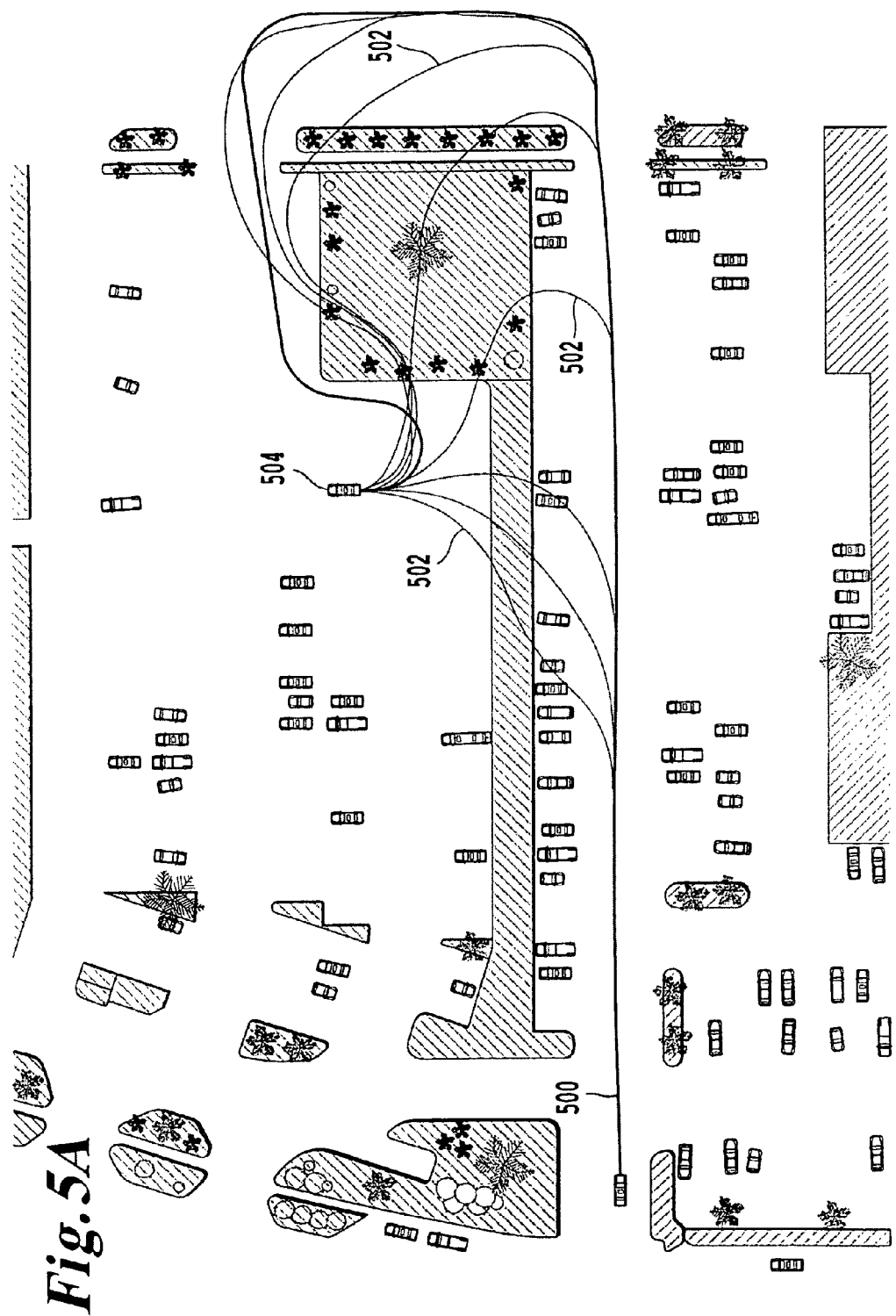

FIGS. 5A-5D illustrate differences between a topological graph to guide path planning, compared to a free-space planner. FIG. 5A shows free-space path planning corresponding to FIG. 2A. In particular, as the sensors of the vehicle 200 extend in range past the line 210 of FIG. 2A (namely as the vehicle traverses path 500 of FIG. 5A), the vehicle 200 determines branches 502 cannot be accomplished because there is topological structure impeding the way to the goal 504, for example by using on-board sensors as previously discussed. As a result, the vehicle 200 resolves to take the path 506 shown in FIG. 5B. This, however, is after the vehicle 200 has re-planned the path a plurality of times after determining each of the branches 502 is impeded.

Figure 5C:
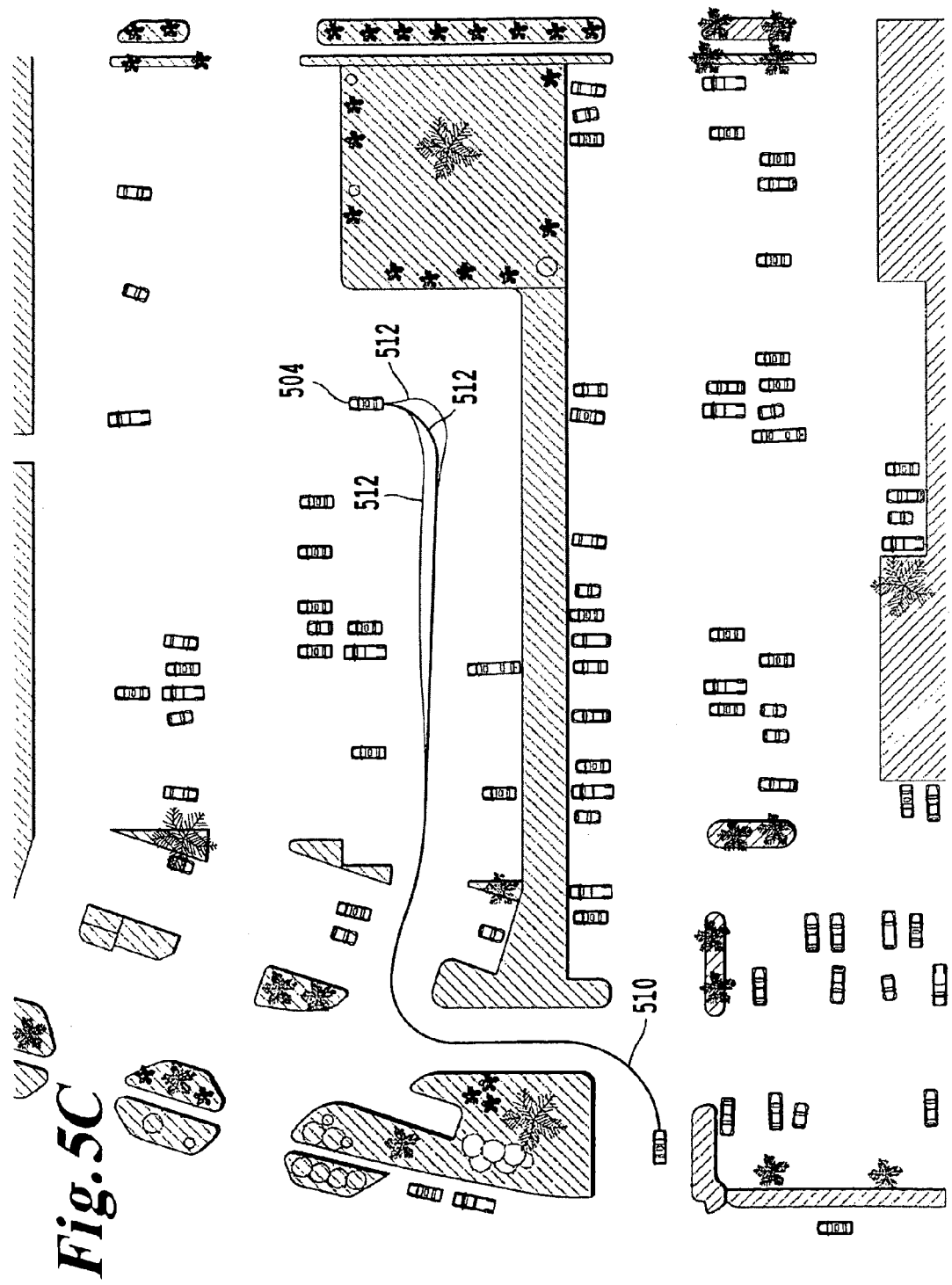
Figure 6A:
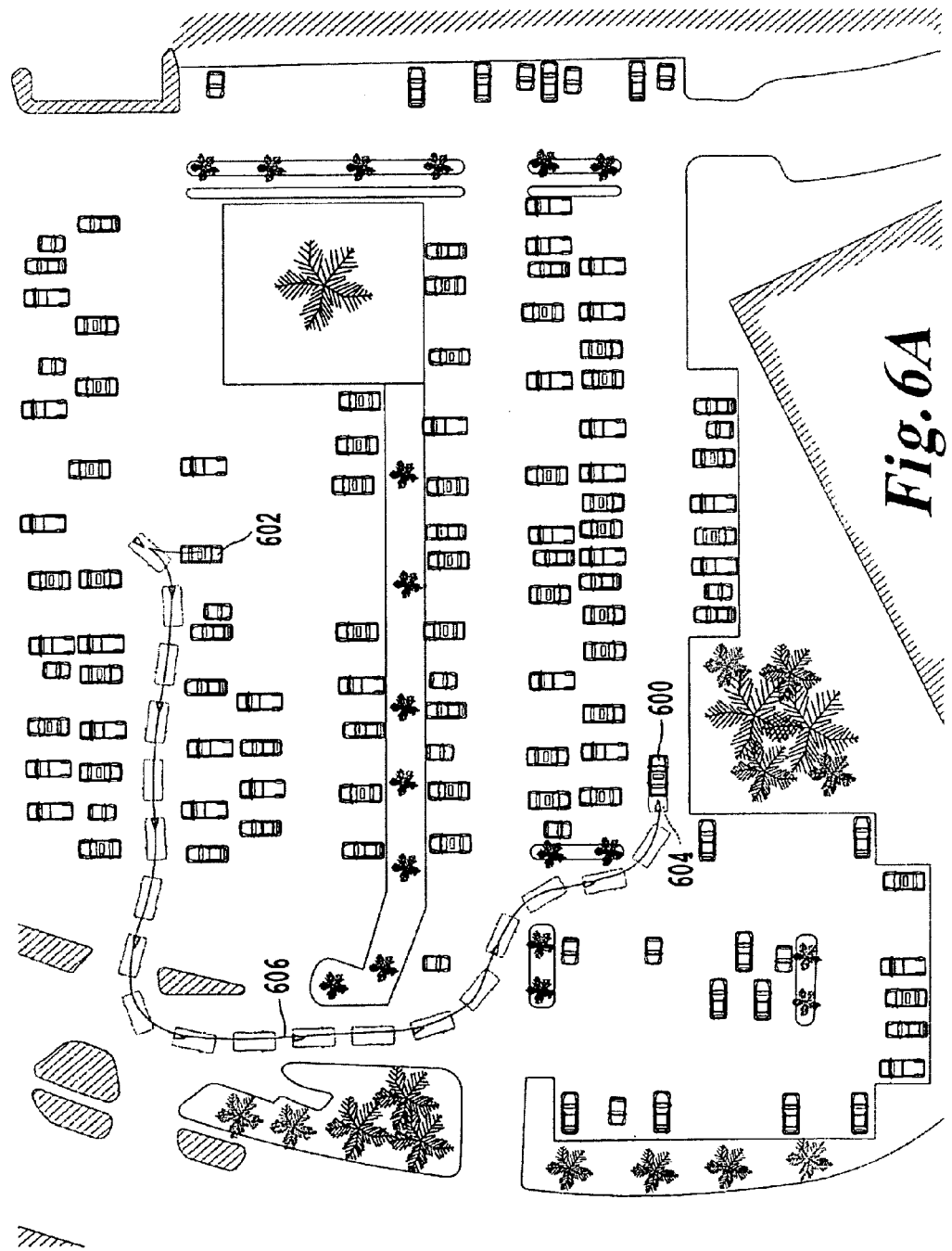
FIGS. 6A-6F show experimental results of path planning based on topological structure in a parking lot.
Figure 6B:
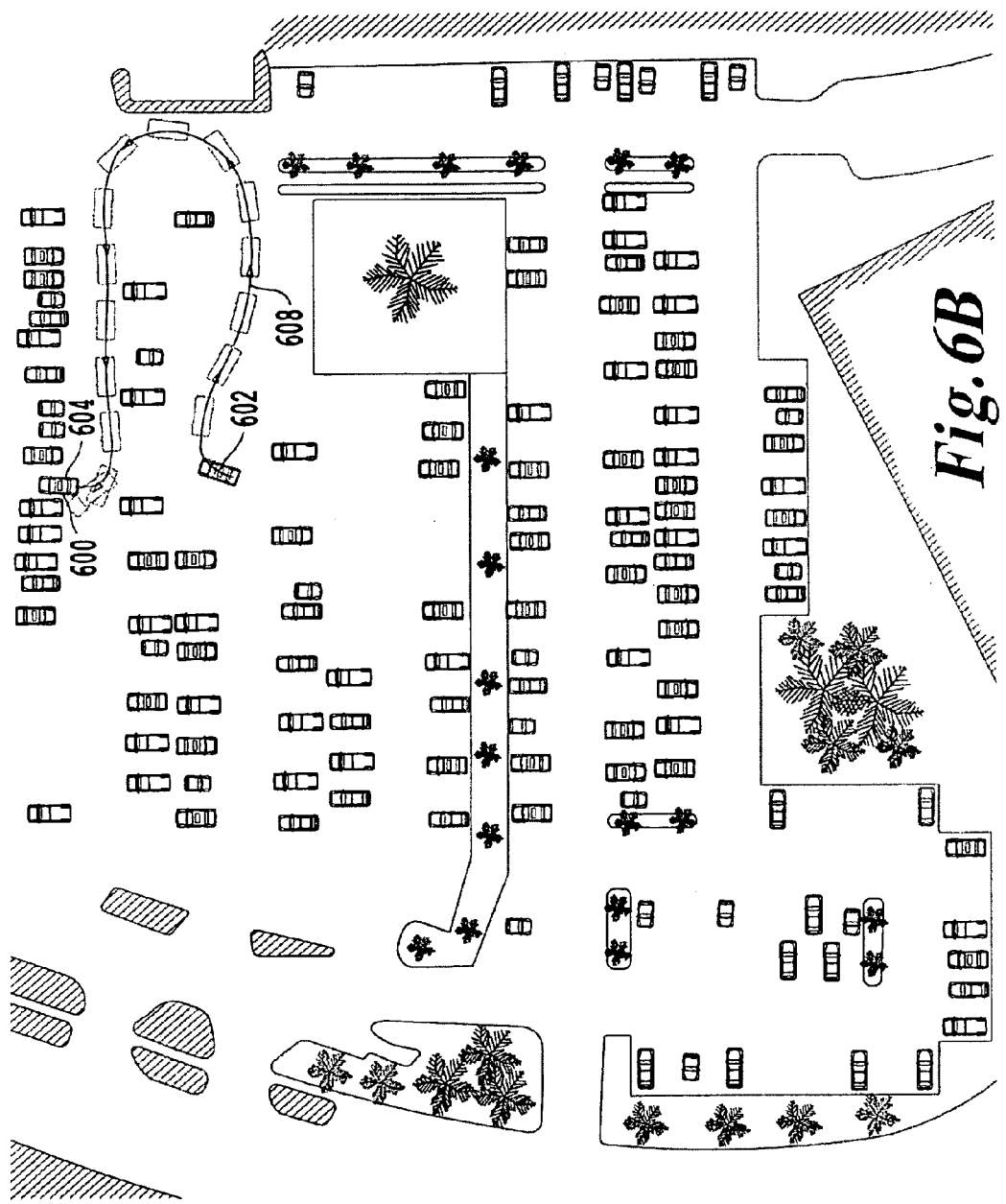
Figure 6C:
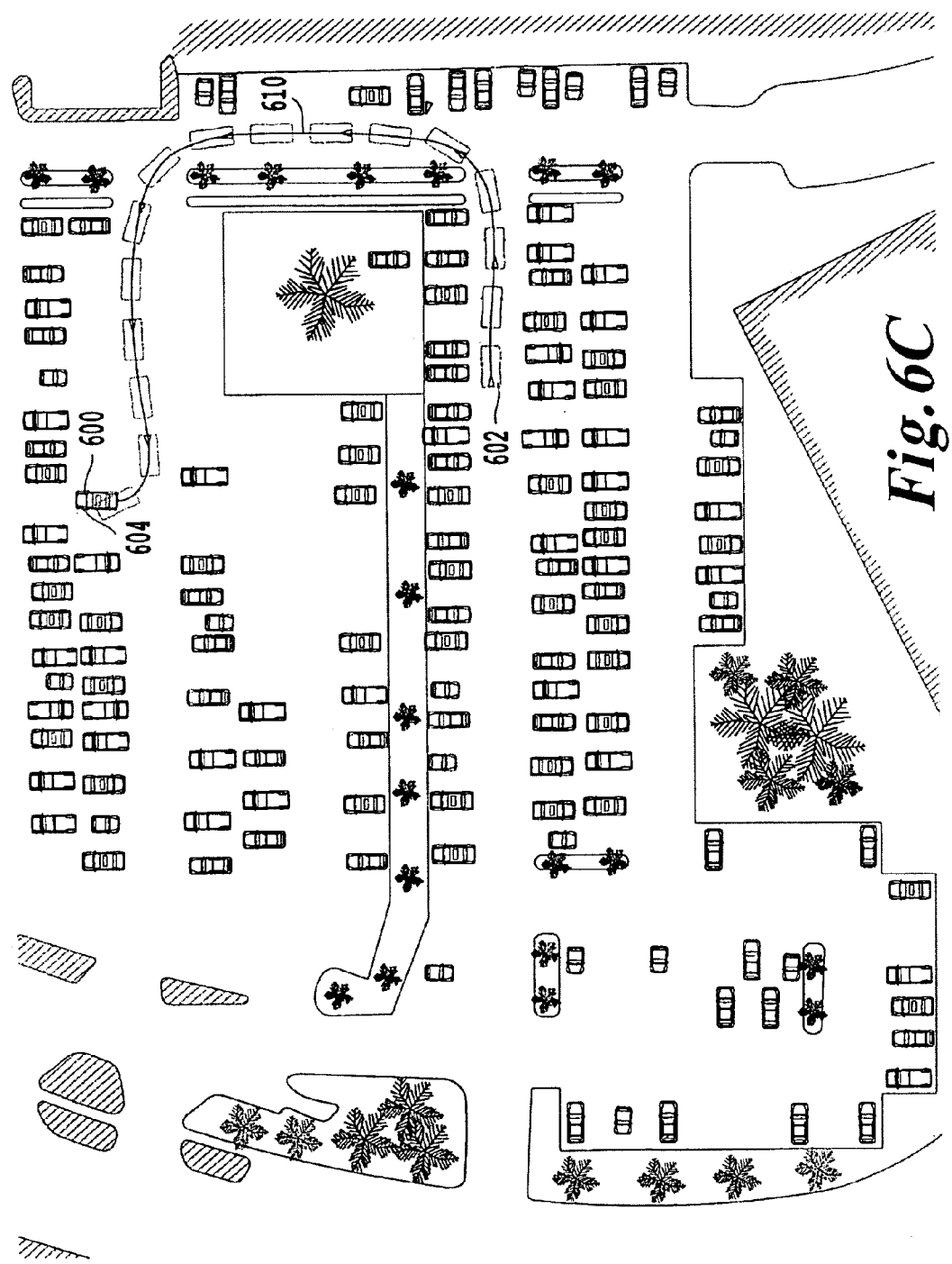
Figure 6D:
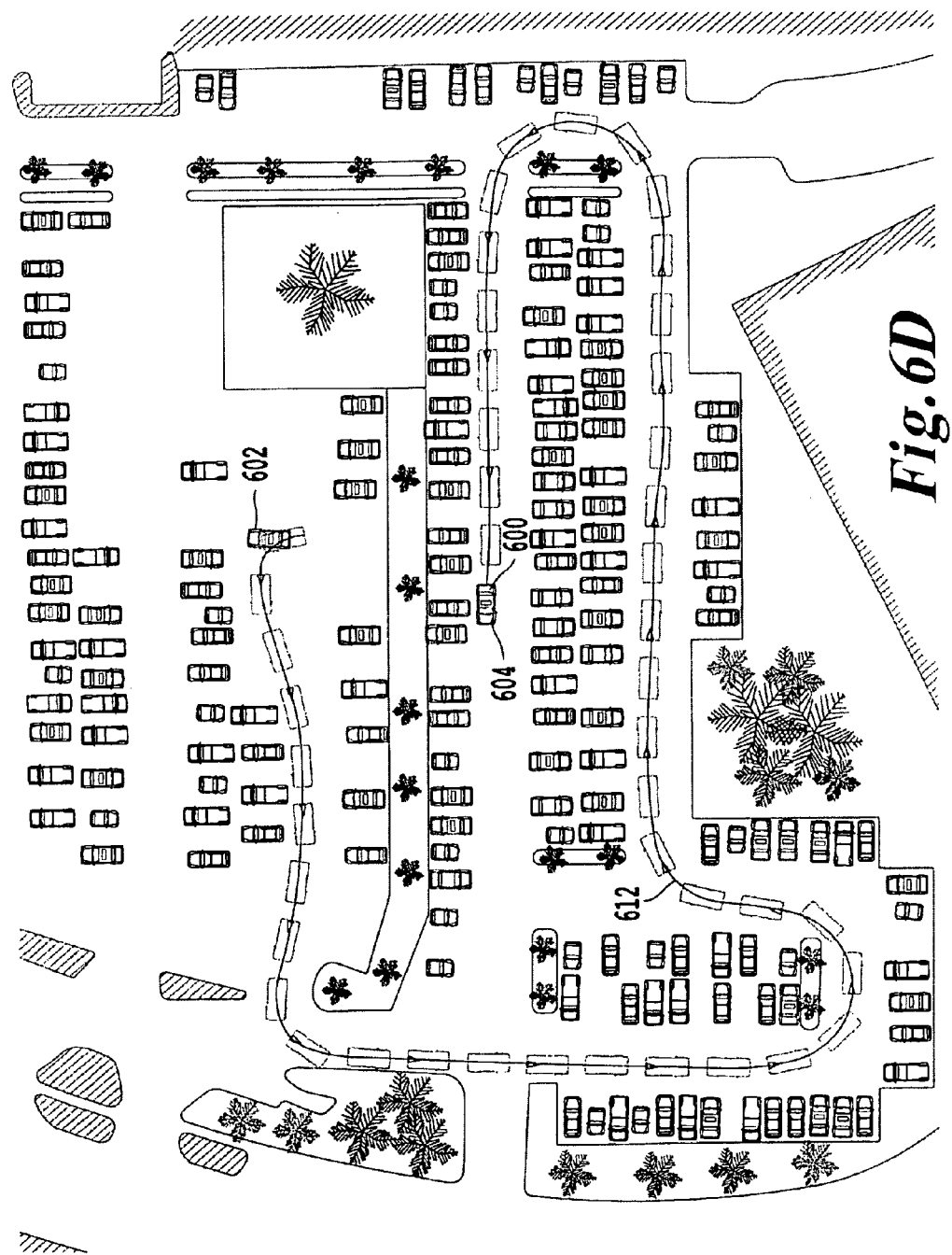
Figure 6E:
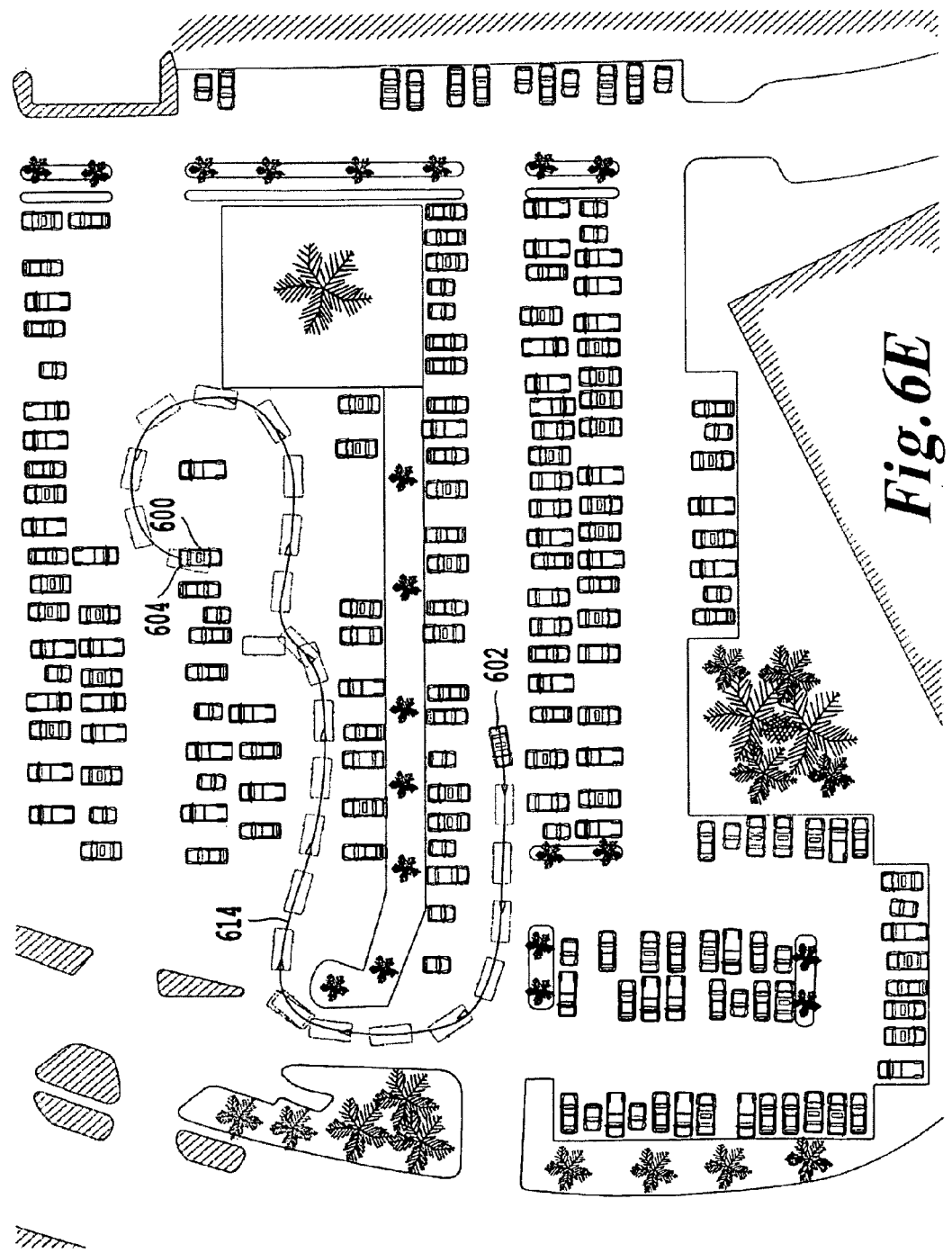
Figure 6F:
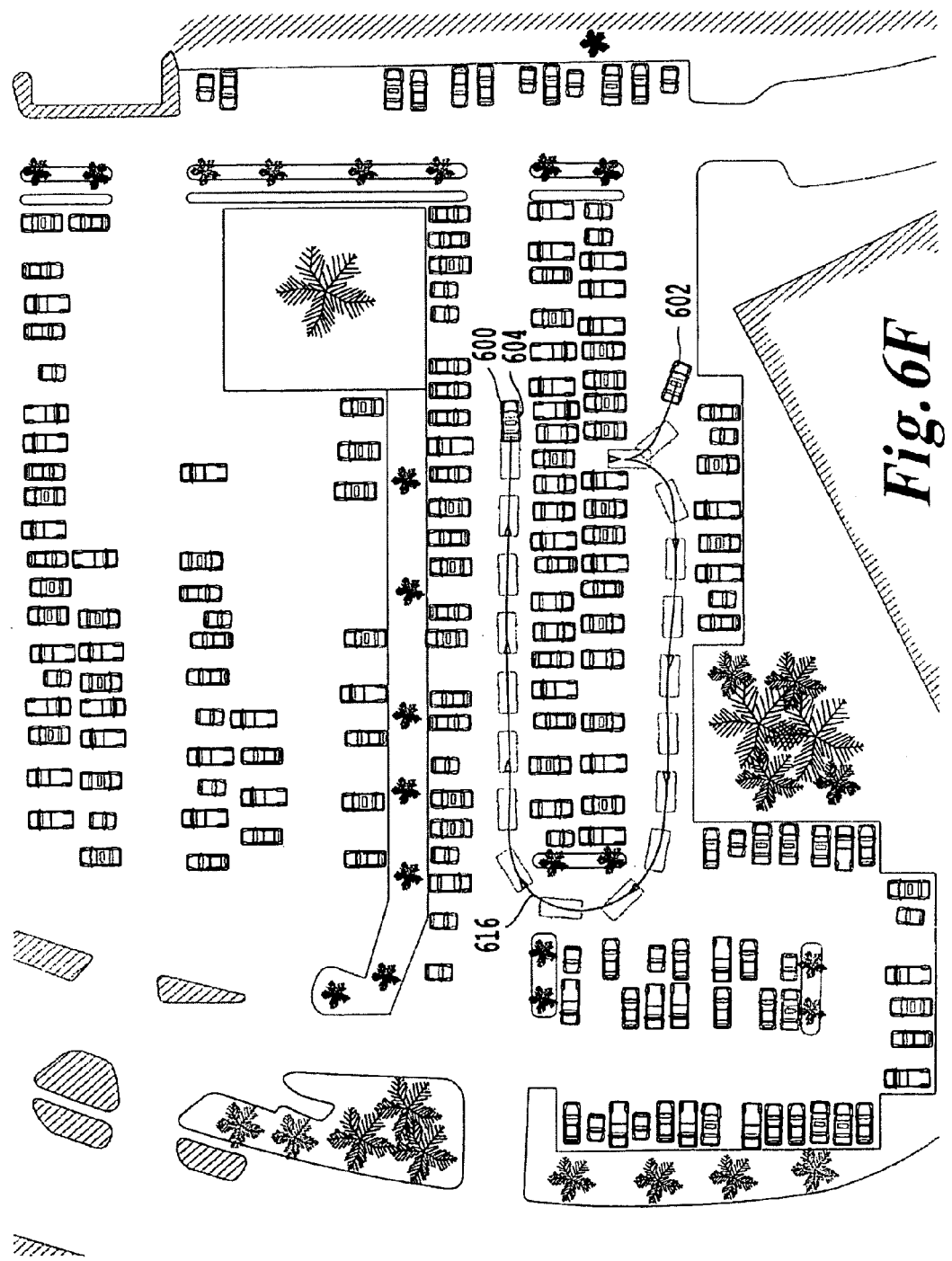

In contrast, FIGS. 5C and 5D show a path performed by a planner guided by a lane-network graph as discussed herein and corresponds to FIG. 2B. Due to a strong prior provided by the lane-network graph 212 of FIG. 2B, fewer re-planning cycles are performed and the final trajectory is shorter. In particular, path 510 of FIG. 5C only branches into a few branches 512, and as a result, expands a significantly lower total of nodes/coordinates of the lane network (experimentally, about 15,000 nodes are used in the process of FIGS. 5C-5D compared to about 650,000 nodes in the process described in FIGS. 5A-5B). FIG. 5D shows the final smoothed path 514.

FIGS. 6A-6F show path-planning experiments performed in a parking lot during live tests showing a vehicle 600 at a starting position 602 with a goal position of 604. The generated trajectories 606, 608, 610, 612, 614 and 616 follow the topological structure of the environment.

Figure 7:
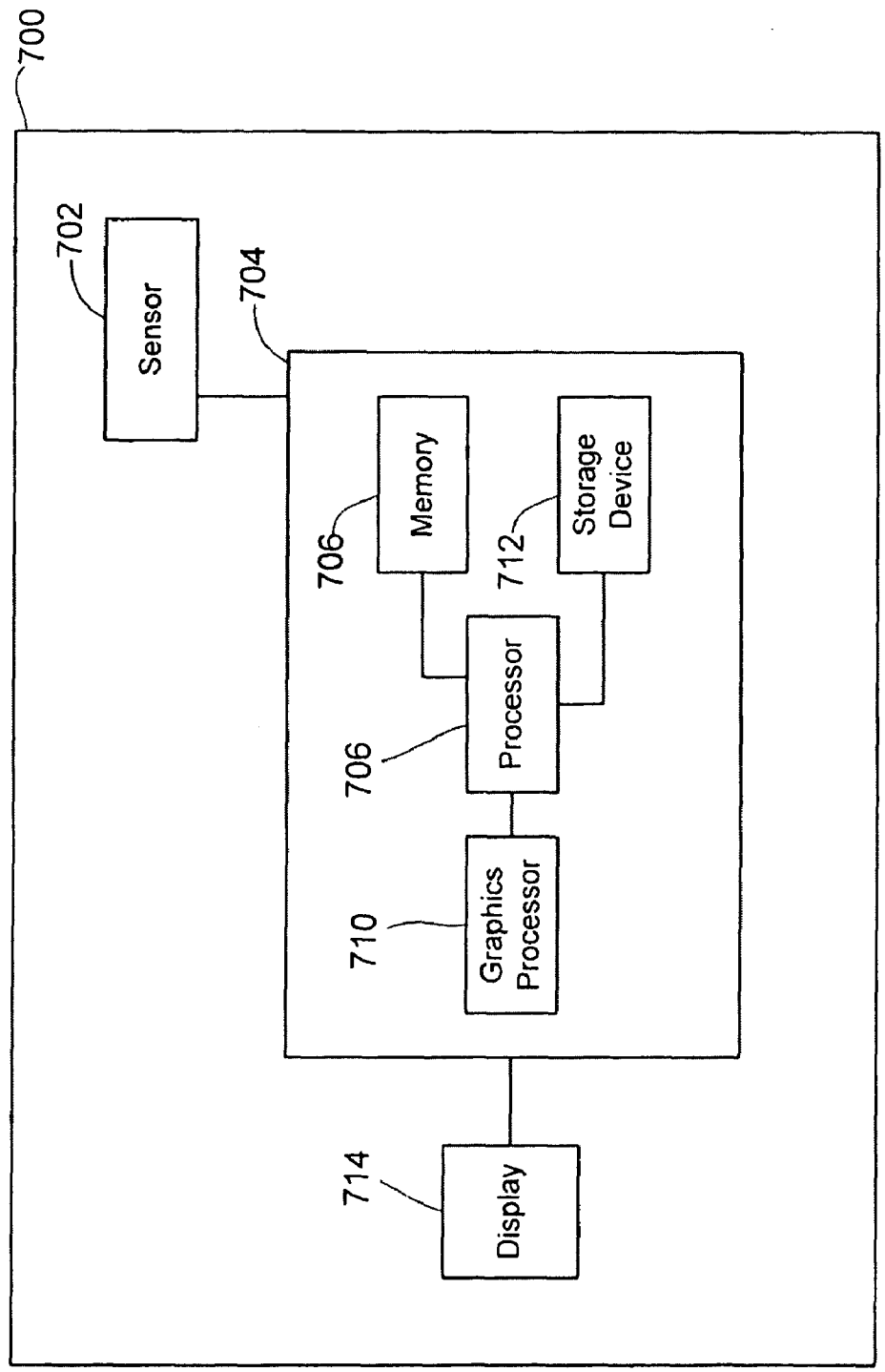
FIG. 7 shows a block diagram of a vehicle and a computing device according to an aspect of the invention.

In one particular embodiment, the above process is performed onboard a vehicle 700 equipped with a 3d LiDAR sensor 702, as illustrated in FIG. 7, using a computing device 704 programmed in the C++ computer language. However, it should be appreciated the process could use a plurality of varying computer languages. The computing device 704 preferably includes a processor 706 configured to process the above algorithm, random access electronic memory 708, a graphics processor 710 and a storage device 712, such as a hard disk drive or a solid-state drive, for electronically storing a determined path and retrieving a lane network for determining a low-cost path. In some aspects, an application specific integrated controller is also used. After a planned low-cost path has been created, it is then displayed using a user-interfaced display 714, such as a touch-screen LCD display, and the graphics processor 710. Any errors are then manually corrected by a user, for instance, using the LCD display 714 including a touch-screen interface where segments of the path can be selected and operations can be performed on the selected segments. In a further aspect, the operations include segment deletion and addition. Further, multiple low-cost paths can be displayed on the LCD display 714, and a user can use the touch-screen interface to choose one of the multiple low-cost paths displayed.

Obviously, numerous modifications and variations of the present invention are possible in light of the above teachings. It is therefore to be understood that within the scope of the appended claims, the invention may be practiced otherwise than as specifically described herein.

The invention claimed is:

1. A method, comprising:
   creating a lane network of an environment for a vehicle using a processor of a computing device and storing the lane network in electronic memory of the computing device;
   calculating a cost function for each of a plurality of coordinates of the environment using the processor from the lane network, a goal position of the vehicle and a state of the vehicle, the state of the vehicle including a location and an angular orientation of the vehicle; and
   determining an obstacle-free path for the vehicle from the location to the goal position by minimizing a calculated cost of the obstacle-free path, the calculated cost being a sum of the cost functions of the coordinates that the obstacle-free path intersects.

2. The method recited in claim 1, wherein the calculating includes calculating a first cost function for each of the plurality of coordinates based on a distance between the each of the plurality of coordinates and the goal position, and then modifying the first cost function with a modifying function corresponding to the lane network and the state of the vehicle.

3. The method recited in claim 2, wherein the calculated cost of the obstacle-free path is defined as $$\rho(s) = \rho_0(s) + w_G \sum_i D(\langle x_i, \theta_i \rangle, G),$$

where $\rho_0(s)$ is the first cost function created using a free-space planner, $$w_G \sum_i D(\langle x_i, \theta_i \rangle, G)$$

is the modifying function and modifies the calculated cost if the obstacle-free path deviates from the lane network defined as G, where $s=\{x_i,\theta_i\}$ is a trajectory of the vehicle at a state $\langle x_i,\theta_i \rangle$, $w_G$ is a predetermined weight factor, and $D(\langle x_i,\theta_i \rangle,G)$ is a distance between the vehicle at a state $\langle x_i,\theta_i \rangle$ and a nearest edge of the lane network G.

4. The method recited in claim 3, wherein the minimizing the calculated cost $$\rho(s) = \rho_0(s) + w_G \sum_i D(\langle x_i, \theta_i \rangle, G)$$

uses a conjugate-gradient descent.

5. The method recited in claim 1, wherein
the determining includes determining a plurality of obstacle-free paths between the location of the vehicle and the goal position,
each of the plurality of obstacle-free paths has a calculated cost, and
an obstacle-free path of the plurality of obstacle-free paths having the lowest calculated cost is recorded onto the electronic memory.

6. The method recited in claim 1, wherein the determining includes smoothing the obstacle-free path.

7. The method recited in claim 1, wherein the environment is a semi-structured environment.

8. A method of planning a path for a vehicle, comprising:
accessing a lane network of an environment stored in electronic memory of a computing device, and determining a location and a goal location of the vehicle within the environment using a processor of the computing device;
calculating a cost function for a plurality of coordinates of the environment between the location and the goal location using the processor, the cost function based on the lane network, the goal location and a state of the vehicle, the state of the vehicle including the location and an angular orientation of the vehicle; and
determining an obstacle-free path of the environment by minimizing a sum of the cost functions corresponding to the coordinates which intersect the obstacle-free path between the location and the goal location using the processor and recording the determined obstacle-free path onto the electronic memory.

9. A computer readable medium including computer executable instructions, wherein the instructions, when executed by a processor of a computing device, cause the processor to perform a method comprising:
creating a lane network of an environment for a vehicle using the processor of the computing device and storing the lane network in electronic memory of the computing device;
calculating a cost function for each of a plurality of coordinates of the environment using the processor from the lane network, a goal position of the vehicle and a state of the vehicle, the state of the vehicle including a location and an angular orientation of the vehicle; and
determining an obstacle-free path for the vehicle from the location to the goal position by minimizing a calculated cost of the obstacle-free path, the calculated cost being a sum of the cost functions of the coordinates that the obstacle-free path intersects.

* * * * *